Figure 1:
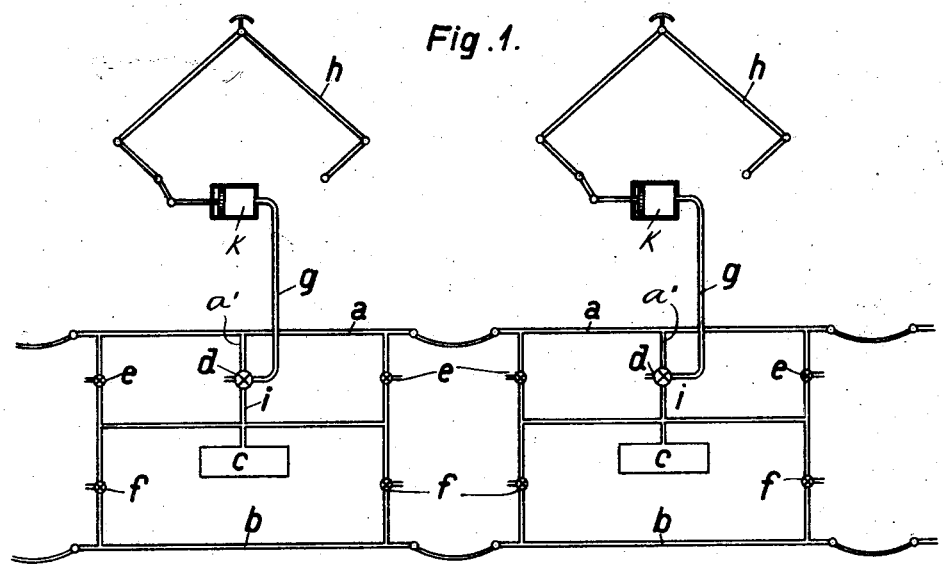

July 17, 1928.

A. WICHERT

PNEUMATIC CONTROL APPARATUS

Filed April 29, 1926

1,677,575

Alfred Wichert
Inventor

By Cromwell, Greist & Warden
Attorneys

Patented July 17, 1928.

1,677,575

UNITED STATES PATENT OFFICE.

ALFRED WICHERT, OF MANNHEIM-NEUOSTHEIM, GERMANY, ASSIGNOR TO AKTIEN-GESELLSCHAFT BROWN BOVERI & CIE., OF BADEN, SWITZERLAND, A JOINT-STOCK COMPANY.

PNEUMATIC CONTROL APPARATUS.

Application filed April 29, 1926, Serial No. 105,613, and in Germany May 11, 1925.

This invention relates to apparatus operated by compressed air or the like, and has particular utility in a pneumatic system of considerable extent or one in which the operated mechanism is to be controlled from a distance.

The principal object is the provision of an arrangement wherein operation may be controlled pneumatically for quick action.

Another object is the provision of an arrangement whereby a plurality of mechanisms separated by considerable distance may be controlled for simultaneous quick operation.

Other objects will be pointed out or indicated hereinafter or will be obvious to one skilled in the art upon an understanding of the invention.

For the purpose of this disclosure I show and describe one arrangement wherein the the invention is employed for the operation of the current collectors or trolleys of electrical railways, and while the invention finds particular utility in such a system, it is to be understood that the arrangement here shown is presented for illustration only and is not to be interpreted as limiting the claims short of the true and most comprehensive scope of the invention in the art.

Figure 2:
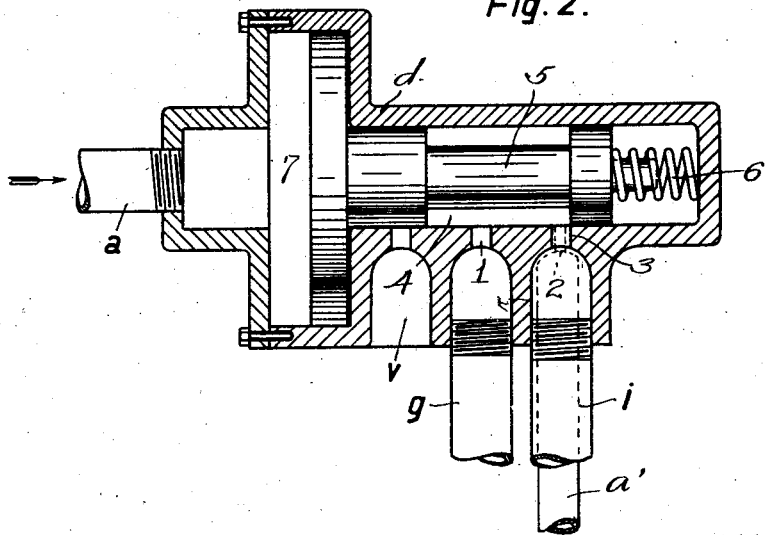

In the drawing,

Fig. 1 is a diagrammatic illustration of the air system on two trolley cars, and Fig. 2 is a section of the automatic relay valve.

Compressed air installations for electric trains are known in which the control pipe for governing the raising and lowering of the pantograph trolley device is used as a pressure equalizing pipe between the air brake reservoirs on the various coaches. All the arrangements of this kind hitherto proposed possess the disadvantage that when lowering the current collectors the only way of escape for the air from the pantograph supply pipe is through the pantograph control pipe and the valve on the driver's platform. With long trains the escape of air from the valve is considerably delayed by the resistance of the long pipes, with the result that the pantographs can only be lowered slowly. This may be a serious disadvantage, particularly in emergency, as for example in the event of a damaged contact wire when it is essential to lower the pantographs quickly.

According to the invention these disadvantages are avoided, in the proposed new arrangement by inserting an automatic valve between the pantograph control pipe and each air reservoir. Under normal working conditions the air reservoir is thereby connected to the pantograph control pipe and the pantograph supply pipe. When the pressure in the control pipe falls, however, the valve cuts off the train pipe and the air vessel and opens the supply pipe of the pantograph to atmosphere. The drawing illustrates the application of the invention, $a$ designates the pantograph control pipe running down the train, $b$ the brake pipe, and $c$ the air reservoirs.

The drawing shows the piping for two motor coaches, but these may be separated by any number of trailer coaches. Each coach is equipped with two valves $e$ for controlling, raising and lowering movements of the pantograph $h$, and two brake valves $f$, corresponding to the number of drivers' platforms. The pantograph control pipe $a$ and the air reservoir $c$ are joined by the pipes $a'$ and $i$ between which is placed the automatic valve $d$ connected to the pantograph supply pipe $g$.

The pantograph valve $e$ is designed to give three positions. In the first position the air from reservoir $c$ flows through $e$ to the pantograph control pipe $a$. A second position is the closed position, the valve cutting off communication between the pipe $a$ and the reservoir $c$. In a third position the valve $e$ opens the pantograph control pipe $a$ to atmosphere and closes the pipe leading to the air reservoir.

The automatic valve $d$ is so arranged that when the pressure in the pantograph control pipe $a$ and air reservoir $c$ are approximately the same, communication through that valve is provided between pipes $i$, $a'$ and $g$. As soon as the pressure in the pantograph control pipe drops, however, the communication between pipes $a'$, $i$ and $g$ is closed and the pipe $g$ is opened to atmosphere.

The installation operates as follows:

The pantograph valves on all drivers' platforms are originally closed. If it is desired to raise the pantograph $h$, the valve $e$ on the particular driver's platform in use is placed in the position so that air may flow from the reservoir $c$ into the pantograph control pipe $a$. This operates the automatic valve $d$ to put pipe $g$ in communication with reservoir $c$. The pantographs are thus raised by the pressure of air supplied to cylinder $k$ through the automatic valve $d$, pipe $a$ being also placed in communication with the reservoir by way of pipe $a'$ and valve $d$. Through the latter connection the pipe $a$ allows of an equalization of air pressure between the various air reservoirs. If it becomes necessary to lower the pantograph suddenly, the valve $e$ is operated so that the pantograph control pipe $a$ is opened to the atmosphere. The pressure in $a$ is thus reduced, with the result that the automatic valve $d$ operates and opens the pipe $g$ to atmosphere after cutting off communication between the pipe $a'$ and the air reservoir. As the air can freely escape from the cylinder $k$, the pantograph is lowered without loss of time. All the pantographs will be simultaneously affected as each pantograph supply pipe is provided with an automatic valve. An example illustrative of the automatic valve is shown in Fig. 2. Here the ports 1, 2 and 3 of pipes $g$, $i$ and $a'$, respectively, are in communication with one another by way of the valve chamber 4 when the valve plunger 5 is held in the position shown, against the compression of spring 6, by pressure of air in the line $a$ effective against the head of the plunger in chamber 7. When the pressure in line $a$ is relieved by the opening of a control valve $e$, plunger 5 is moved by spring 6 to close ports 2 and 3 and put port 1 in communication with atmosphere through vent $v$.

By virtue of the arrangement, therefore, it will be seen that each of the pantograph's air pipes and air cylinders is opened individually to atmosphere whenever the pressure in the control line $a$ is reduced to the extent to permit the automatic valve to be operated by its spring. Thus all of the pantographs may be controlled in common without requiring their air cylinders to be exhausted by way of the control line. This permits the lowering of the pantographs much more quickly and substantially in unison.

With suitable modifications the above arrangement may also be employed for other apparatus using compressed air as the operating medium, for example, oil switches.

What I claim is:

1. In railway equipment, in combination, a plurality of cars each having a current collecting device; a pneumatically operated positioning device for the collecting device on each car; a pressure reservoir on each car; a control line connecting the cars; a supply pipe for each positioning device; an automatic valve on each car operable to one position to establish communication between the reservoir and supply pipe on the car and the control line, and to another position to open the supply pipe to atmosphere and cut off communication between the reservoir and control line, said valves operable to the first mentioned position by air pressure in the control line; and a control valve for controlling pressure in the control line.

2. Pneumatic control apparatus comprising, in combination, a plurality of pneumatically operated devices, pressure reservoirs associated with said devices respectively, a control line arranged for communicating connection with the reservoirs, automatic valves associated with respective reservoirs and operated devices, said automatic valves operable by pressure in the control line to one position to establish communication between the associated reservoirs and operated devices and the control line, said automatic valves effective in another position to vent the operated devices and cut off communication between the reservoirs and control line, and a control valve effective in one position to vent the control line and in another position to establish communication between a reservoir and the control line.

3. In railway equipment, in combination, a plurality of cars each having a current collector, a pneumatically operated device for positioning each collector, a pressure reservoir serving each pneumatically operated device, a control line for connection with the reservoirs, a supply pipe for conducting pressure fluid from each reservoir to its pneumatically operated device, an automatic valve controlling communication through each supply pipe, said valves held by pressure in the control line to maintain communication between the reservoirs and supply pipes and operating on relief of such pressure to cut off communication between the reservoirs and supply pipes and vent the latter and the pneumatically operated devices to atmosphere, and a control valve for controlling pressure in the control line independently of that in the supply pipes.

In testimony whereof I have hereunto subscribed my name at Stuttgart, Germany on the 22nd day of March, A. D. 1926.

ALFRED WICHERT.